Jan. 24, 1939.  A. F. JONES  2,144,981
COMBINATION SALT AND PEPPER SHAKER
Filed March 30, 1938
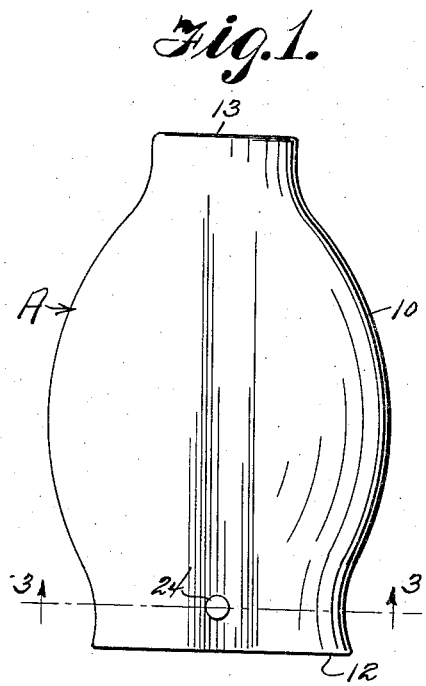
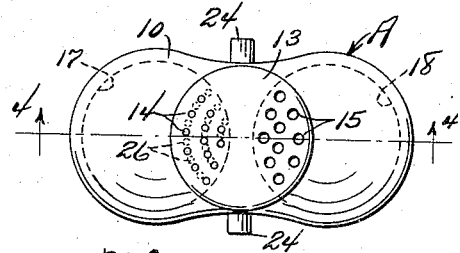
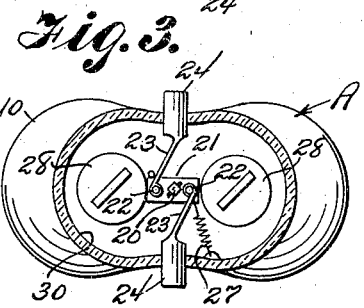
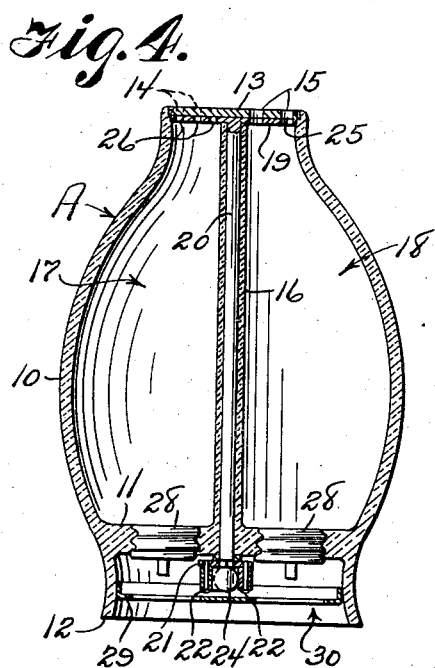
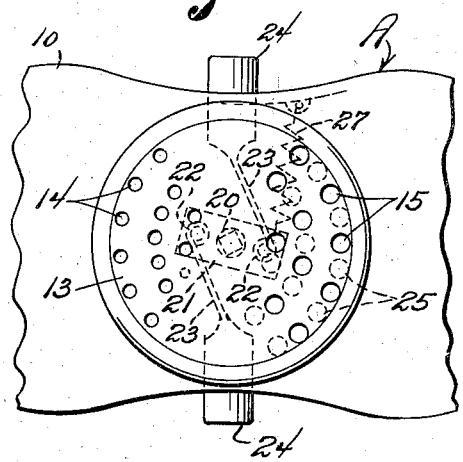
Areal F. Jones
INVENTOR
BY Victor J. Evans & Co.
ATTORNEYS Patented Jan. 24, 1939

2,144,981

UNITED STATES PATENT OFFICE 2,144,981

COMBINATION SALT AND PEPPER SHAKER

Areal F. Jones, Amarillo, Tex.

Application March 30, 1938, Serial No. 199,035

1 Claim. (Cl. 65—45)

The invention relates to a condiment holder and more especially to a salt and pepper shaker.

The primary object of the invention is the provision of an article of this character, wherein the body is divided into two chambers, one being for salt and the other for pepper, and through control of a shutter functioning as a valve when it is desired to dispense pepper from the article the salt therein is shut off from flow, thus at the option of the user of the article either pepper or salt can be dispensed therefrom selectively.

Another object of the invention is the provision of an article of this character, wherein salt and pepper can be readily and easily introduced into the separated chambers or compartments within the body of the article without waste and such article is hand controlled for selective dispensing of either salt or pepper at the will of the user.

A further object of the invention is the provision of an article of this character, which is simple in its construction, thoroughly reliable and efficient in operation, neat in appearance, readily and easily operated and inexpensive to manufacture.

With these and other objects in view the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is an elevation of the holder constructed in accordance with the invention.

Figure 2 is a top plan view thereof.

Figure 3 is a sectional view on the line 3—3 of Figure 1 looking in the direction of the arrows.

Figure 4 is a sectional view on the line 4—4 of Figure 2 looking in the direction of the arrows.

Figure 5 is an enlarged fragmentary top plan view showing in detail the control for regulating the dispensing of the contents of the holder.

Similar reference characters indicate corresponding parts throughout the several views in the drawing.

Referring to the drawing in detail, A designates generally the article constructed in accordance with the invention and comprises a hollow body 10 made from any suitable material and may be of any external shape or configuration having a bottom 11 set inwardly from the lowermost resting edge 12 of such body. The top 13 of the body 10 has provided therein separated groups of holes 14 and 15, respectively, the holes of one group being smaller than the holes of the other group.

Formed interiorly of the body 10 is a longitudinally disposed dividing web or partition 16 separating the interior of said body into independent chambers or compartments 17 and 18, respectively, the latter chamber or compartment having the group of holes 15 common thereto while the group of holes 14 are common to the chamber or compartment 17 so that the contents of these chambers or compartments can be readily dispensed or discharged through the groups of holes 14 and 15 selectively and in a manner presently described.

Beneath the top 13 is a rotatable shutter or valve acting disk 19, the web or partition 16 being of a construction to afford a clearance for the said shutter or disk 19 adjacent to the top 13 of the body 10. Rotatably fitted centrally of the web or partition 16 is the turning stem 20 of the shutter or disk 19, these being integral with each other while the top 13 is removable from the body 10 for the fitting of the stem 20 before described.

The stem 20 is carried without the bottom 11 of the body 10 and has fixed thereto inwardly with respect to the rest edge 12 of the body a crosshead-like lever 21 to which are pivoted at 22 on opposite sides of the stem 20 the linkage ends 23 of push buttons or operating members 24, these being slidably fitted in the body 10 at diametrically opposite points thereof adjacent to the rest edge 12 of said body and on actuating either of the buttons or members 24, the shutter or disk 19 will be rotated to have the perforations 25 therein which are normally registering with the openings 15 moved out of registration therewith and simultaneously to bring the perforations 26 in this shutter or disk 19 into register with the openings 14. Normally the chamber or compartment 18 having the openings 15 leading therefrom can discharge content therefrom on upsetting and shaking the body 10, this chamber or compartment 18 being receptive of salt. The shutter or disk 19 in normal position has the openings 25 registering with the openings 15 while the openings 26 in the said shutter or disk are normally out of register with the openings 14 thus preventing the discharge of the content of the chamber or compartment 17 which is receptive of pepper.

Attached to the crosshead lever 21 and fixed within the body 10 is a coiled retractile spring 27 which functions to hold the shutter or disk 19 in normal position as before set forth.

The bottom 11 has fitted therein removable closure plugs 28 which on removal give access to the respective chambers or compartments 17 for the filling of the same.

A guard 29 is fitted within the recessed area 30 created next to the rest edge 12 of the body so as to shield the operating parts associated with the stem 20.

The spring 27 normally holds the buttons 24 extended beyond opposite sides of the body 10 to be hand actuated for the working of the shutter or disk 19 in the use of the shaker or holder for selective dispensing of contents therefrom.

The arrangement of the buttons or push lugs 21 enables the operation of the shutter or disk 19 from either side of the body 10 of the shaker.

What is claimed is:

An article of the kind described comprising a hollow body having a web interiorly thereof dividing the same into independent compartments, said body having a top provided with groups of openings, the openings of one group being of a different size with respect to the openings of the other group and these groups being common to the respective compartments, a shutter turnable within the body next to the top and having groups of openings corresponding to the groups of openings in said top, the openings in one group in said shutter being in register with the openings of one group in the top while the other group of openings in said shutter being out of alignment with the other group of openings in said top, a stem rotatably fitting said web and united with said shutter, a crosshead lever fitting said stem, actuating members exposed at opposite sides of the body and operatively connected with said crosshead lever for the turning of said stem, and means active with the lever for holding the actuating members in extended position for operation.

AREAL F. JONES.